J. Dodge.

2 Sheets, Sheet 1.

Making File-Blanks.

No. 2,904 Reissued Mar. 31, 1868.

Witnesses.
Jos. H. Coombs
M. Bailey

Inventor.
James Dodge
by A. Pilote
his atty

N. PETERS, PHOTO-LITHOGRAPHER, WASHINGTON, D. C.

2 Sheets, Sheet 2.

J. Dodge,

Making File-Blanks.

No. 2,904. Reissued Mar. 31, 1868.

Witnesses.
Jos. L. Coombs
A. Bailey

Inventor.
James Dodge
by A. Bliss
his atty

UNITED STATES PATENT OFFICE.

DAVID BLAKE, ASSIGNEE OF JAMES DODGE, OF WATERFORD, NEW YORK.

IMPROVED MACHINE FOR ROLLING, SHAPING, AND FORGING FILE-BLANKS, FLIERS, AND OTHER METALLIC ARTICLES OF SMALL DIMENSION.

Specification forming part of Letters Patent No. 54,310, dated May 1, 1866; Reissued No. 2,904, dated March 31, 1868.

*To all whom it may concern:*

Be it known that JAMES DODGE, of Waterford, in the county of Saratoga and State of New York, but now temporarily residing at Manchester, in the county of Lancaster, in the Kingdom of Great Britain, has invented, constructed, and applied to use certain new and useful improvements in the mode of manufacturing, by rolling and forging, file-blanks, "fliers," and other metallic articles of small dimension, and in the apparatus for accomplishing the same; and it is hereby declared that the following specification, taken in connection with the drawings making a part of the same, is a full, clear, and exact description thereof.

Figure 1:
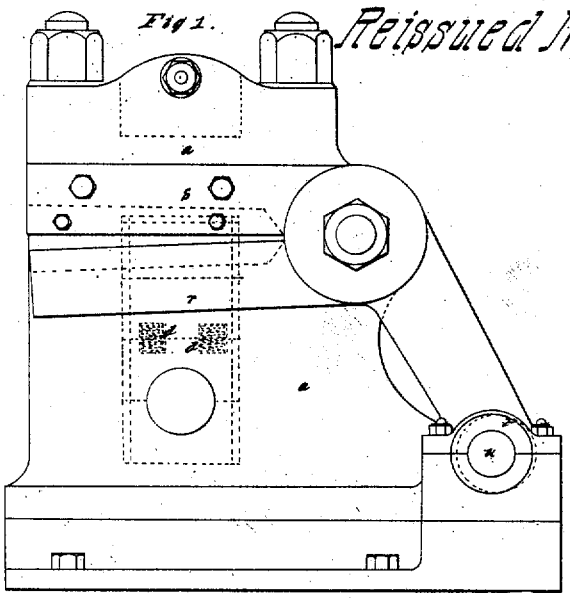
Figure 3:
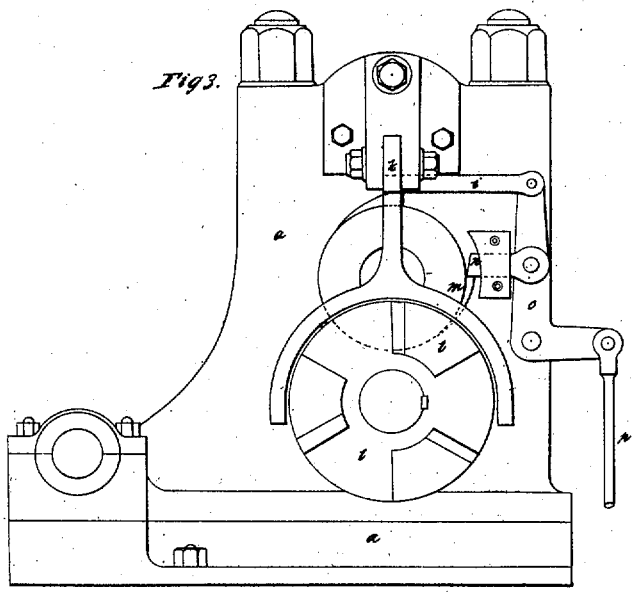
Figure 2:
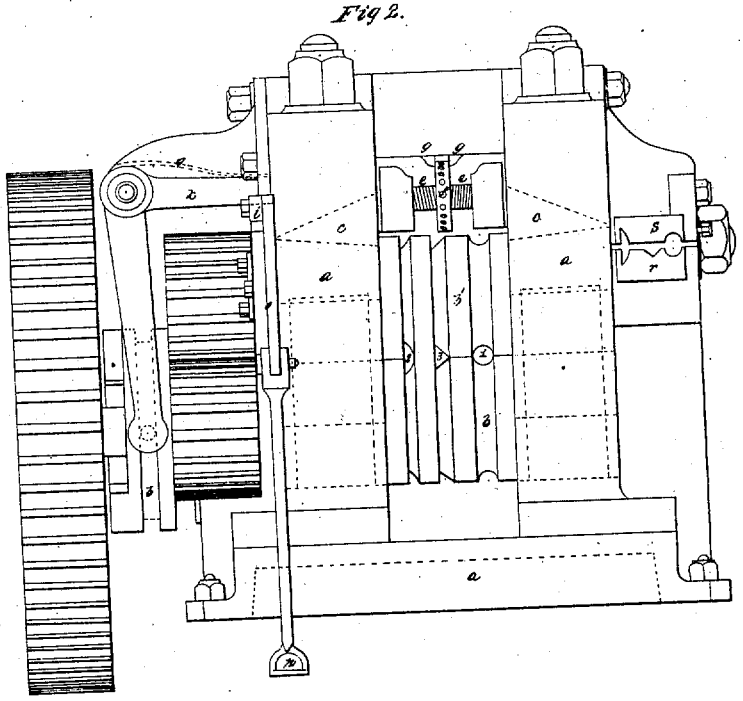
Figure 4:
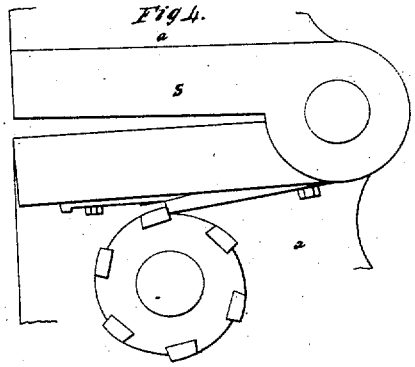

Figure 1 represents an elevation, viewed from the left-hand side, of the rolling-machine, showing the peculiar arrangement and construction of the apparatus in connection with the clutch-box for starting and stopping such machine. Fig. 2 represents a front elevation of the apparatus, showing more particularly the position of the rollers with dies or matrices formed therein for rolling the metal, and the pair of jaws or levers, also supplied with dies or matrices for forging. Fig. 3 represents an elevation, viewed from the right-hand side, of the machine, illustrating more clearly the jaws or levers for forging, and also the arrangement of mechanism for actuating the same; and Fig. 4 represents an arrangement of tappets for actuating the under jaw in place of the eccentrics.

The invention herein described, so far as it relates to the improvement in the mode of manufacturing the various articles to which it is adapted, involves the use of two sets of apparatus, one of which must operate upon the metal by rolling it and the other by compressing or swaging it, the shape of the article being predetermined by the pattern of the acting part of such rollers and compressors. The process of manufacture requires the alternate use of these two sets of apparatus, whose combined effect tends to the production of one result, but whose separate action produces opposite consequences, so far at least that the one tends to correct the errors which the other is disposed to occasion.

The invention of the said JAMES DODGE resides, first, in the employment of a pair of rollers furnished with scores of a form adapted to the article to be made, which rollers have an intermittent motion, dependent upon the will of the operator, to allow of the proper insertion of the blank, and, in combination with such rollers, an independent compressing apparatus furnished with dies conforming to the shape of the scores in the rollers; secondly, in a novel method of regulating the distance between the rollers; and it consists in the use of two wedges which are inserted in the pedestals above the bearings of the top roller, and are moved nearer to or farther from each other by a right-and-left-handed screw, which is provided with a collar that is held by snugs in a central block. By turning this screw the wedges are moved, and increase or decrease the distance between the rolls. The steps of the top roller are held up, so as to bear against the wedges, by means of springs inserted between the steps of the rollers. The lower one of the rollers employed in the rolling process is furnished with toppels or lifters, which act upon the movable lever or "jaw" of the pair of jaws for forging or pressing the metal, the whole being operated by gearing. The power is communicated to the rolls by means of a clutch-box having steel-faced clutches and worked by levers actuated by a treadle. The upper roller is furnished with a "swell" or cam, which at a certain part of the revolution lifts a bolt that raises the clutch-box lever and throws the clutch out of gear, and simultaneously a projection on the same roller comes into contact with a short arm or "stop" and effects the instantaneous stoppage of the rollers. This takes place at every entire revolution of the rollers, so that the attendant has sufficient time to adjust the metal and to place it properly under the rollers or jaws. The operator places his foot on the treadle and withdraws the short arm and bolt. The latter releases a spring, which forces the clutch-box into gear and starts the machine.

In order that the invention may be better understood and explained in detail, I have hereunto attached sheets of drawings made upon a scale of about three inches to the foot, similar letters of reference being marked upon corresponding parts on all figures.

In Figs. 1, 2, 3, and 4, *a a* is the framing of the machine, supporting the rollers *b* and *b'*. The top roller, *b'*, is capable of being raised from or lowered nearer to the bottom roller, *b*, (according to the thickness of metal required to be operated upon,) by the wedges *c c* and springs *d d*, which, being inserted between the bearings of the two rollers, has a tendency to raise the top roller, *b'*, the distance between such rollers being regulated by the counter-action of the wedges *c c*, which are moved nearer to or farther from each other by a right-and-left-handed screw, *e*, which is provided with a collar, *f*, which is held by the snugs *g g* in a central block, so that by twining the screws *e* the wedges are moved and increase or decrease the distance between the rollers.

The top roller, *b'*, is furnished with a swell or cam, *h*, which at a certain part of the revolution lifts the bolt *i*, which raises the lever *k* in connection therewith and actuates the clutch-box *l*, which is furnished with steel clutches, thereby throwing such steel clutch out of gear. Simultaneously the projection *m* on the roller *b'* comes into contact with the short arm or stop *n*, secured on the bell-crank lever *o*, and thus effects the instantaneous stoppage of the rollers *b* and *b'*, which stoppage is effected at every entire revolution of the rollers, thereby giving the attendant sufficient time to adjust the metal to be operated upon under the rollers or jaws; and it will be evident that by adding "lifts" or cams the rollers may be stopped more frequently than once every revolution.

When ready to start the operator places his foot on the treadle *p*, which immediately withdraws the short arm or stop *n* and the bolt *i*. The latter releases the spring *g*, which forces (through the medium of the lever *k*) the clutch *l* into gear and starts the machine. The movement or action of the under lever or jaw employed for forging "blanks" in conjunction with the fixed top jaws, *s*, is obtained by means of the eccentric *t*, secured on the pinion or driving-shaft *u*. (Seen in Fig. 1.)

The rollers *b* and *b* and the pair of jaws *r* and *s* are provided with dies or matrices to suit the different form and shape of the file-blanks or other metallic articles required.

The grooves 1, 2, and 3 in the rollers and the recesses in the jaws exhibit the form of matrices employed for rolling and forging round, half-round, and angular file-blanks, and are shown as examples. The movement of this lower jaw may also be effected by means of a cam or tappets, if preferred, as seen in Fig. 4.

In the present instance the rolling apparatus and the compressing or swaging apparatus we exhibited as mounted upon one frame. This, however, though convenient and desirable, is not essential, as it is obvious that the same mode of operation will be accomplished when the two sets of apparatus exist as separate machines.

It is to be understood that the invention of the said JAMES DODGE does not comprehend broadly the use in alternation of rolling and swaging machinery for forging and shaping metallic articles; but

What is claimed as the invention of the said JAMES DODGE is—

1. The combination, with a rolling apparatus having an intermittent movement, of a swaging apparatus, all constructed substantially as described, and so used alternately that a piece of metal will, as the mean effect of the rolling and swaging operations, be fashioned into shape, substantially in the manner hereinbefore set forth.

2. Governing the rotation of the rollers so as to stop and start such rotation at any desired time or position by the means described or by other mechanical equivalents.

3. The combination and use of the wedges and springs, constructed and arranged as described, for regulating the distance of the rollers.

DAVID BLAKE.

Witnesses:
WM. W. RICKARD,
C. LEONARD PENDLETON.